Feb. 8, 1938.   H. J. L. FRANK   2,107,412
ELECTRICAL DISTRIBUTION SYSTEM
Original Filed Feb. 15, 1932
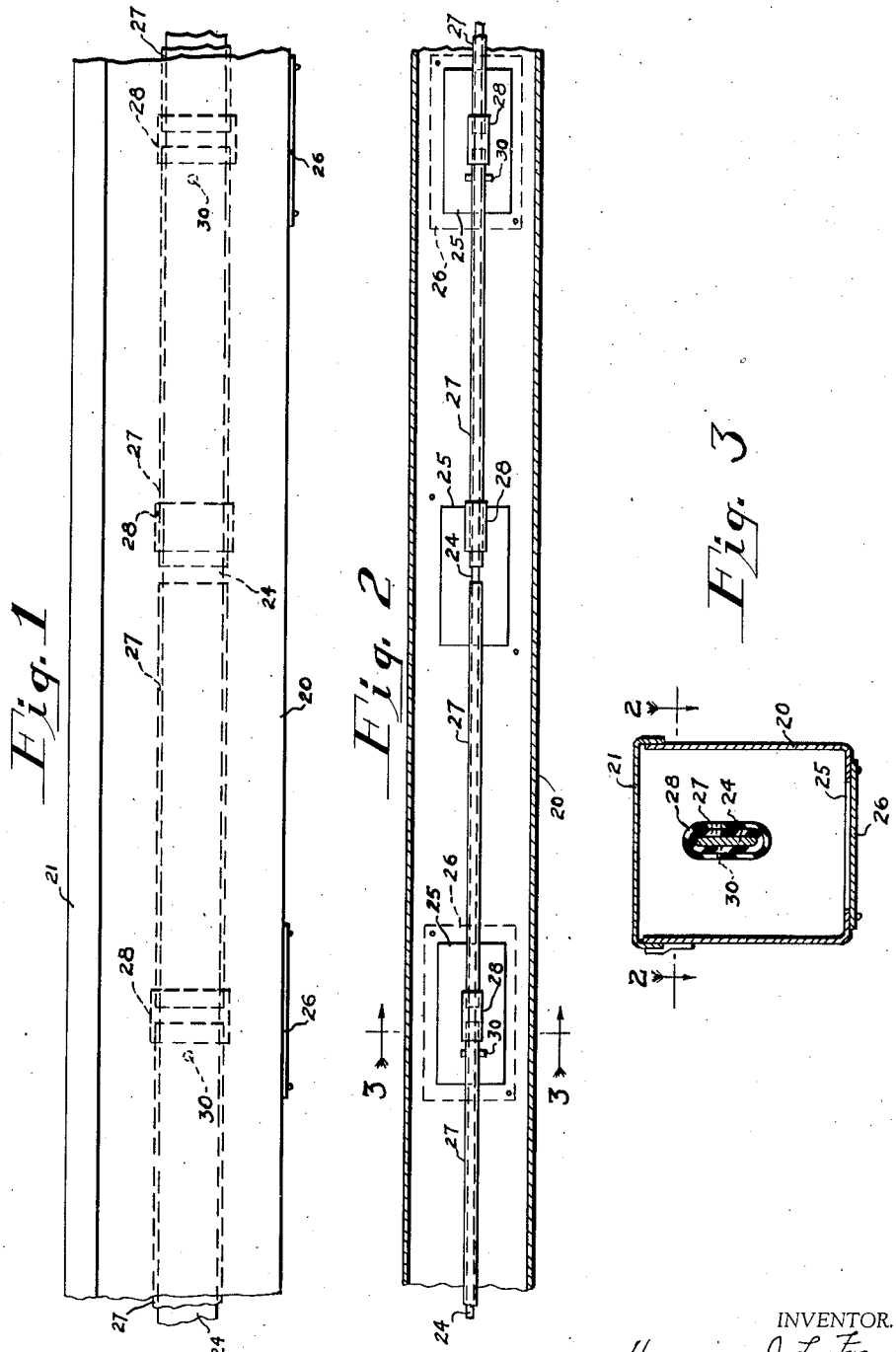
INVENTOR.
Harrison J. L. Frank
BY Daniel G. Cullen.
ATTORNEY.

Patented Feb. 8, 1938

2,107,412

UNITED STATES PATENT OFFICE 2,107,412

ELECTRICAL DISTRIBUTION SYSTEM

Harrison J. L. Frank, Detroit, Mich., assignor to Bulldog Electric Products Company, Detroit, Mich., a corporation of West Virginia Original application February 15, 1932, Serial No. 592,912, now Patent No. 2,043,796. Divided and this application January 10, 1936, Serial No. 58,605

2 Claims. (Cl. 247—3)

This application relates to electrical distribution systems of the bus duct type and is a division of application Serial No. 592,912, filed February 15, 1932, now Patent No. 2,043,796, and relates principally to arrangements for insulating a bus run in a duct run. The application discloses, in the appended drawing, a bus duct run comprising a duct run having uniformly spaced openings through which access to the within contained bus run may be attained and the bus run in the duct run is insulated by an arrangement of slidable sleeve insulators which may be shifted longitudinally without severance or multilation thereof, to expose the bus run at one or more desired openings of the duct run.

In the accompanying drawing,

Fig. 1 is a fragmentary elevation view of a bus duct run;

Fig. 2 is a longitudinal section of the same on line 2—2 of Fig. 3;

Fig. 3 is a transverse section of the same on line 3—3 of Fig. 2.

Referring to the drawing, it will be seen that the bus duct run there shown includes a duct run in the form of a duct or casing 20 having one of its walls formed as a hinged cover 21. Within the duct run is a suitably supported bus run 24. The wall of the run opposite the hinged cover wall is provided at uniformly spaced points with openings 25 normally closed by covers 26 removably secured thereon by screw fastening means or the like; selected ones of the covers may be opened to provide access to the bus run in the duct run at desired points of the duct run.

For insulating the bus run, there are provided long sleeves 27 of rigid insulating material of such diameter as to fit on the run with a fair degree of friction, whereby they will not shift around the bus run except as caused so to do by the user. The sleeves 27 are so disposed on the bus run as to leave gaps between the ends, and these gaps are covered by short sleeves 28 of rigid insulating material large enough in diameter to encompass the ends of the small sleeves, with a fair degree of friction.

The bus run is shown as completely insulated by sleeves 27 and 28, except at one opening 25 where a cover 26 has been removed.

When for any reason the location of the exposed points of bus run is to be varied, suitable covers 26 are removed and suitable sleeves 27—28 are shifted to expose the bus run where the covers have been removed, and the various sleeves may be shifted to conceal already existent and no longer desired bare spots on the bus run. The baring of a bus run at one spot where it was previously covered, and the covering of a bus run where it was previously bare, may be accomplished easily and readily and without the aid of tools, special equipment, taping, etc., and merely by shifting the sleeves.

While the sleeves are shown and described as maintained stationary on the bus bars by their own friction-producing proportions, it will be understood that other means, such as wooden pegs 30, may be used to create friction between the sleeves 27 and the bus bars. When such pegs are used, they may be sheared off by the sleeves 28 as the latter are shifted about on the sleeves 27. These pegs also serve to space the short sleeves on the longer ones, uniformly if desired.

While two sizes of sleeves are shown, it is obvious that one size alone or more than two sizes may be employed, the only desirability being that no sleeves be longer than the distance between the uniformly spaced openings normally covered by the covers.

I claim:

1. In an electrical distribution system, a long run of bus bar, and means for insulating the run including a plurality of short insulating sleeves on, and covering substantially the entire length of said bus run, the sleeves being larger in cross section than the bus bars so as to be slidable along the run, without destruction or alteration of themselves or the bus bar, to expose the bus bar at desired points on the run, and to insulate the bus bar at other points.

2. In a electrical distribution system, a long run of bus bar, and means for insulating the run including a plurality of short insulating sleeves on, and covering substantially the entire length of said bus run, the sleeves being larger in cross section than the bus bars so as to be slidable along the run, without destruction or alteration of themselves or the bus bar, to expose the bus bar at desired points on the run, and to insulate the bus bar at other points, one series of the sleeves being slidable over the sleeves of the other series and normally overlapping their ends to insulate certain parts of the bus bar left exposed by the last named series of sleeves.

HARRISON J. L. FRANK.